(No Model.)
P. F. BARRY.
CHANNEL AND FEATHER CUTTER.
No. 256,454. Patented Apr. 18, 1882.
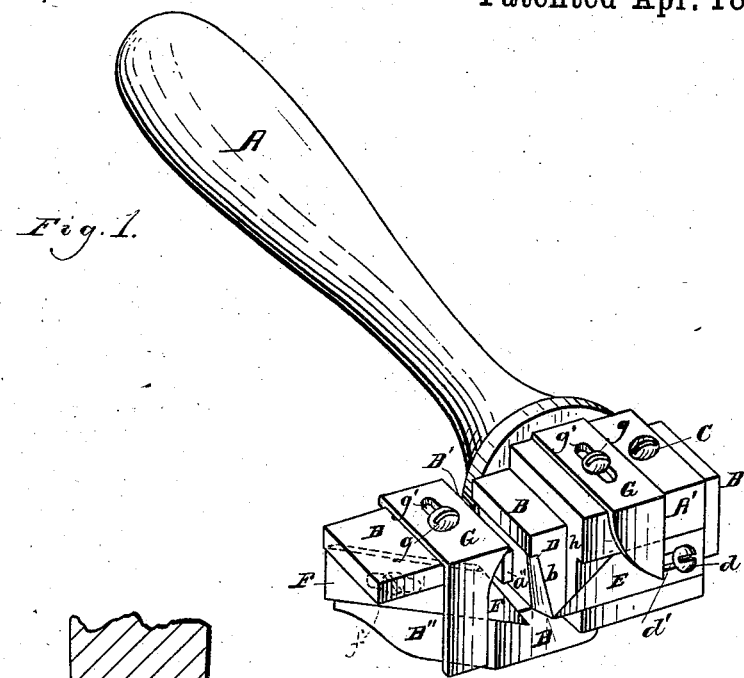
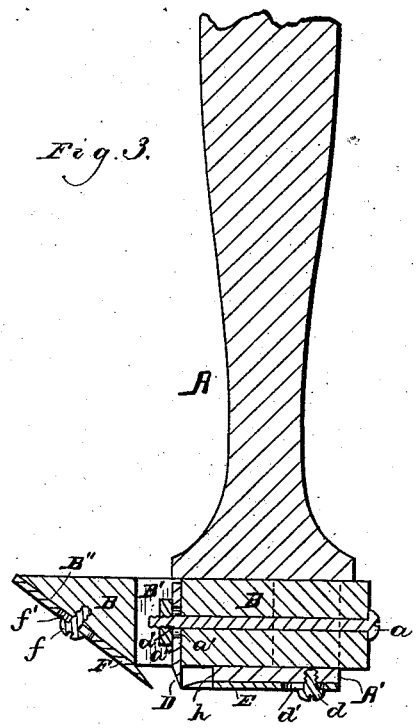
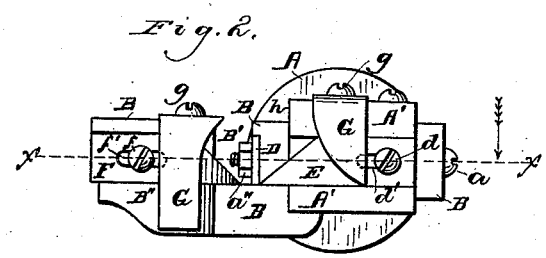
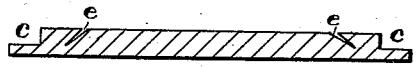
Witnesses.
Henry Frankfurter,
Herman Paseth
Inventor.
Patrick F. Barry
per F. F. Warner — his
Attorney.

UNITED STATES PATENT OFFICE.

PATRICK F. BARRY, OF CHICAGO, ILLINOIS, ASSIGNOR OF ONE-HALF TO HENRY R. VANDERCOOK, OF SAME PLACE.

CHANNEL AND FEATHER CUTTER.

SPECIFICATION forming part of Letters Patent No. 256,454, dated April 18, 1882.

Application filed February 18, 1882. (No model.)

*To all whom it may concern:*

Be it known that I, PATRICK F. BARRY, of Chicago, in the county of Cook and State of Illinois, have invented certain new and useful Improvements in Channel and Feather Cutters, of which the following, in connection with the accompanying drawings, is a specification.

In the drawings, Figure 1 is a perspective representation of a channel and feather cutter embodying my invention. Fig. 2 is a bottom view thereof. Fig. 3 is a section in the plane of the line $x\ x$, and Fig. 4 is a cross-section of a sole after the same has been operated upon by my improved cutter.

Like letters of reference indicate like parts.

A is the handle of the tool, to the lower end of which is rigidly fastened a hollow metallic stock or holder, A'.

B is a block arranged in the holder A', and adjustably secured therein by means of a set-screw, C, the adjustability of the said block being in a lateral direction with reference to the handle, or endwise with respect to the said block, as will be perceived on reference to the drawings. In the front face or side of the block B, I sink a deep and comparatively broad channel, B', and on the inner or left-hand end of the block B, I make a beveled or inclined portion or part, B'', the inclination of which is equal to the inclination of the channel to be cut.

D is a vertical blade applied to a side of the channel B' by means of a bolt, $a$, passing through the block B and through a slot, $a'$, in the said blade, a nut, $a''$, being run upon the inner end of the said bolt, as shown. The cutting end or edge of the blade D is beveled, as shown at $b$, Fig. 1. This blade is intended to make the inner or vertical cut of the feather when the tool is used for the purpose for which it is intended, and $c$, Fig. 4, represents such a cut.

E is a blade attached to the lower part of the stock A' by means of a set-screw, $d$, passing through a slot, $d'$, in the said blade and entering the stock. This blade is adapted and arranged to cut the lower or horizontal cut in feathering the sole. Such a cut is shown at $e$, Fig. 4. As a piece or strip is cut away from the sole in feathering, the points of the blades D and E should meet, as shown.

F is the channeling-blade. This blade is applied to the inclined part B'' by means of a screw, $f$, which passes through a slot, $f'$, in the blade and into the block B.

G G are gages for regulating the depth of the cuts. These gages are adjustably connected to the block B by means of set-screws $g\ g$ entering the block and passing through slots $g'\ g'$ in the gages, as shown.

I deem it best, in order to prevent the blades and gages from being turned or twisted out of their proper places, to countersink the block B to receive them.

In order to use this tool for the purpose for which it is intended, I take the tool firmly by the handle and hold it vertically in the right hand, the edge of the sole lying against the inner edge, $h$, of the stock A', which edge serves as a gage to guide the tool during its work. By drawing the tool along, and at the same time pressing down firmly upon it and holding the gage $h$ against the edge of the sole, the blades will cut their way into the sole, the blades D and E will cut the feather, and the blade F will make the channel, all in one operation.

The gages G G may be set to regulate the depth of the cuts and the block B may be set to regulate the distance of the cuts from the edge of the sole, the blade E being also so set that its point will meet, or nearly meet, the blade D, or at least meet the cut made by the blade D. By this means the cuts are not only all made simultaneously, but the tool may be set or adjusted to vary the depth and location of the cuts. The depth of the channel may be varied independently of other adjustments by setting the cutting-edge of the blade F a greater or less distance below the block B, and the blade D, by being adjustable vertically, may be set to always meet the cut made by the blade E. All the blades may be removed with facility for the purpose of being sharpened, repaired, or replaced, and their edges, even after being much worn away by use and by sharpening, may always be so set as to perform their work properly, owing to the adjustability described.

The device, as will be perceived, is a hand-tool. It is simple in its construction and operation, and will do with facility varied work of the class intended to be performed by it.

Having thus described my invention, what I claim as new, and desire to secure by Letters Patent, is—

1. A combined channel and feather cutter containing the laterally-adjustable block B, carrying the inclined adjustable blade F and the vertical adjustable blade D, and the laterally-adjustable horizontal blade E, applied to the stock, all combined for operation together substantially as and for the purposes specified.

2. The combination, with the stock of a shoemaker's tool, of the adjustable block B, the inclined adjustable blade F, and the vertical adjustable blade D, both applied to the said bar, the horizontal adjustable blade E, applied to the stock, one or more gages, G G, and a gage, h, substantially as and for the purposes specified.

PATRICK F. BARRY.

Witnesses:
F. F. WARNER,
H. FRANKFURTER.